United States Patent [19]

Amrhein

[11] 4,293,764
[45] Oct. 6, 1981

[54] CONTROL CONSOLE

[75] Inventor: Herbert Amrhein, Moehrendorf, Fed. Rep. of Germany

[73] Assignee: Siemens Aktiengesellschaft, Berlin & Munich, Fed. Rep. of Germany

[21] Appl. No.: 68,091

[22] Filed: Aug. 20, 1979

[30] Foreign Application Priority Data

Sep. 29, 1978 [DE] Fed. Rep. of Germany ....... 2842622

[51] Int. Cl.³ .................. H01H 9/04; H01H 9/16; H01H 3/12
[52] U.S. Cl. ...................... 200/302; 200/314; 200/340; 200/330
[58] Field of Search ............ 200/302, 310, 317, 314, 200/340, 5 A, 153 T

[56] References Cited

U.S. PATENT DOCUMENTS

| | | | |
|---|---|---|---|
| 3,523,169 | 8/1970 | Di Pilla | 200/314 |
| 3,657,492 | 4/1972 | Arndt et al. | 200/302 |
| 3,978,297 | 8/1976 | Lynn et al. | 200/302 |
| 4,017,700 | 4/1977 | West | 200/314 |
| 4,059,737 | 11/1977 | Gergand | 200/302 |
| 4,163,883 | 8/1979 | Boulanger | 200/314 |

OTHER PUBLICATIONS

Chomerics Technical Bulletins 967, 969, 971, 973, 976, 980.

*Primary Examiner*—John W. Shepperd
*Attorney, Agent, or Firm*—Hill, Van Santen, Steadman, Chiara & Simpson

[57] ABSTRACT

In exemplary embodiments, operation of microswitches is to be made possible with sterile operating gloves in the operating room. To this end, the disclosure provides that the cover plate be covered with a continuous stiff plastic sheet. The latter plastic sheet is arched so as to be raised in a bubble-like fashion in the region of each switch actuating element. There thus results an edge-free and gap-free surface which can be wiped off with a disinfectant solution. In addition, the invention provides that the interior sides of the bubbles may be printed with symbols. The disclosed embodiments are particularly suited for control consoles which are to be utilized in sterile rooms.

13 Claims, 8 Drawing Figures

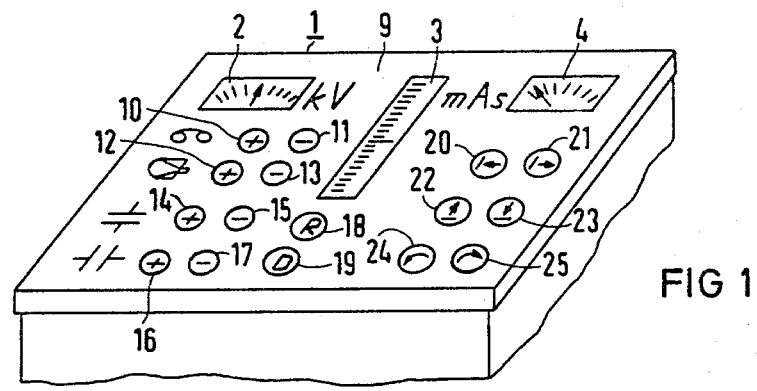
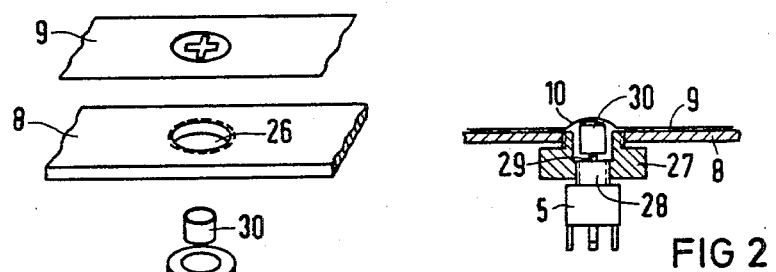
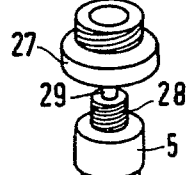
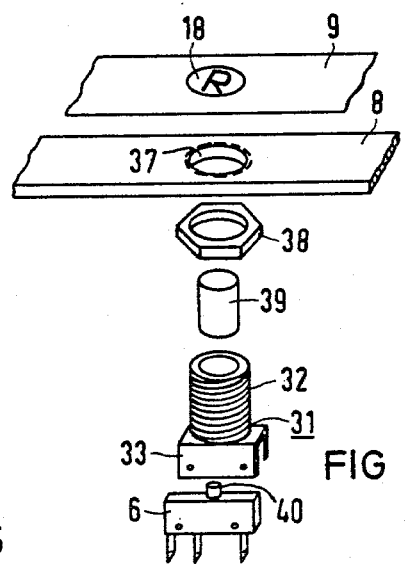
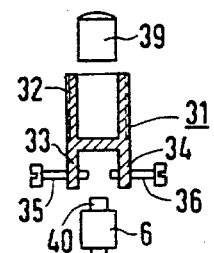

U.S. Patent  Oct. 6, 1981  Sheet 2 of 2  4,293,764
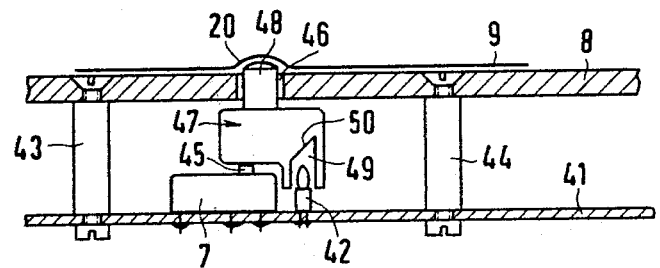
FIG 6
FIG. 6A
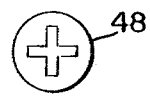
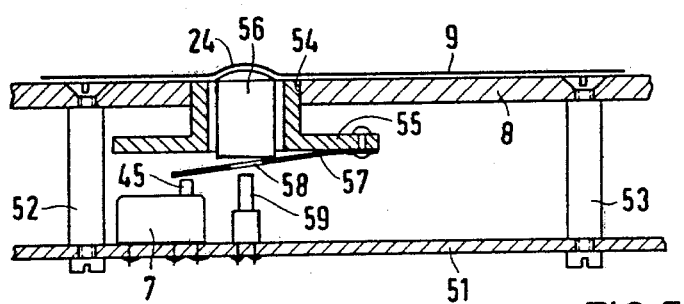
FIG 7

CONTROL CONSOLE

BACKGROUND OF THE INVENTION

The invention relates to a control console comprising installed microswitches, particularly for the control of apparatus in the operating room.

In the case of all apparatus which are to be utilized in the operating room, the sterilizability of at least all touchable surfaces is necessary. All parts which cannot be sterilized in some form must be covered with sterile sheets prior to the operation. This is virtually not possible, particularly in the case of control consoles in which the displayed measured values must be read off and the switches to be operated cannot be actuated in a blind fashion. If such control console, namely, is wiped off with a disinfectant, in the case of push buttons, the risk always remains that the protruding edges of these push buttons, when depressed, take up germs from the interior of the apparatus and that they will have become unsterile by the time of their release. This leads to the necessity of setting up these control consoles in an auxiliary room. During the operation, an additional operator must be there who operates and monitors the control console at the call of the operating room.

SUMMARY OF THE INVENTION

Accordingly, the object underlying the invention consists in finding a method of construction, in the case of a control console in which switches are to be actuated, which is readily sterilizable and remains sterile even in the case of repeated operation with sterile operating gloves.

Accordingly, in accordance with the invention, in the case of a control console of the type initially cited, the cover plate is covered with a plastic sheet which is stiff throughout, which is arched up in a bubble-shaped fashion in the region of each individual actuating element of the installed microswitches. In the case of a control console thus equipped, the respective switching element of the microswitch can be actuated pursuant to a through-depression of the arched bubble. This extremely advanced construction unites a plurality of advantages:

(1) Every gap is avoided through which germs can be transported from the interior, non-sterile part of the apparatus to its surface.

(2) Upon wiping off with a disinfectant solution, the latter cannot penetrate the interior of the apparatus and have a corrosive effect therein.

(3) There are no grooves and angles which are not reached during wiping.

(4) The pressing in of the bubble produces a tactile acknowledgement (or reply) via the switching path.

(5) The acoustically audible and tactile popping (or clicking) effect occurring pursuant to depression of the bubble represents a very desired acknowledgement via the switching point.

(6) Finally, the bubble also permits a blind keying of the switch, if necessary.

(7) It is also an advantage that, due to the sudden drop in resistance of the bubble—the popping effect—the switching element of the microswitch, which is disposed therebelow, is each time reliably depressed through to the limit stop.

The operation of the switches is significantly facilitated if, in an expedient embodiment of the invention, the interior sides of the bubbles, facing the microswitches, are printed with symbols. In this manner, erroneous operations are avoided. The operation can thus also proceed with very many switches by means of an inexperienced individual.

In a particularly advantageous further development of the invention, the interspace between the individual bubble-like archings of the plastic sheet and the respectively allocated positioning element of the microswitch can be bridged by a plastic cylinder. What is achieved thereby is that the wearing off (or attrition), particularly of the symbol printed on the inner side of the bubble, is greatly reduced.

A further increase in life is achieved if the plastic cylinder, in an embodiment of the invention, is matched to the diameter of the bubble and if it is convexly protrudingly arched on the side facing the plastic sheet. As a consequence of this, a locally intensified wear of the plastic sheet in the marginal region of the plastic cylinder is avoided. Moreover, the springing back of the bubble to its initial position pursuant to release is thus supported (reinforced). This prolongs its life.

In another type of embodiment of the invention, the bubble-like projecting archings of the plastic sheet can be kept transparent, and the end faces of the plastic cylinder which are facing the individual bubbles can be printed with one symbol each. This modification brings with it the advantage that the symbols wear off less readily, and, particularly if they are engraved in the plastic cylinder, they achieve a significantly longer life than on the bubble. Simultaneously the printing is thus protected from all bending stresses.

In a particularly advantageous further development of the invention, a light source can be allocated to the plastic cylinder. The consequence of this is that the symbols printed on the bubbles in a transparent fashion can also be well-recognized in a darkened room and thus facilitate locating of the bubble.

Further details of the invention shall be explained on the basis of some exemplary embodiments illustrated on the accompanying sheets of drawings; and other objects, features and advantages will be apparent from this detailed disclosure and from the appended claims.

BRIEF DESCRIPTION OF THE DRAWINGS

FIG. 1 presents a somewhat diagrammatic partial perspective view illustrating an exemplary layout of a control console;

FIG. 2 presents a cross section of a microswitch screwed onto the cover plate of the control console;

FIG. 3 presents a separate illustration ("exploded" view) of the individual assembly parts of FIG. 2;

FIG. 4 presents an illustration of the individual assembly parts (in an "exploded" view) in the case of another microswitch mounted on the control console;

FIG. 5 presents a diagrammatic section of the guide sleeve for the plastic cylinder of the microswitch of FIG. 4;

FIG. 6 presents the matching of a microswitch, which is flow-soldered beneath the cover plate of the control console on a printed circuit board, to the requirements of the control console in accordance with the invention;

FIG. 6A is a diagrammatic plan view illustrating an end face of a plastic cylinder 48 printed with a symbol; and FIG. 7 presents an arrangement of a microswitch which is modified in comparison with the illustration of FIG. 6.

DETAILED DESCRIPTION

In FIG. 1, there can be seen in a plan view a control console 1 of an x-ray examination apparatus (not illustrated) with three indicator instruments 2, 3, 4 and sixteen microswitches 5, 6, 7, for the control of an apparatus, which are illustrated in FIGS. 2 through 7. The microswitches illustrated in FIGS. 6 and 7 are identical. The cover plate 8 (FIGS. 2, 3, 4, 6, 7) of the control console 1 is covered by a single continuous plastic sheet 9. The plastic sheet is drawn laterally over the border of the cover plate 8. In the region of the sixteen microswitches, the plastic sheet 9 is protrudingly arched (or curved) in bubble-formation by means of a deep-drawing process and colored with a dark color so as to be opaque. In the region of the visible surfaces (or areas) of the three indicator instruments 2, 3, 4, the plastic sheet 9 is kept transparent. Only the symbols on the protrudingly arched bubbles 10 through 25 as well as on the plane surfaces are colored in the silk-screen process so as to be translucently white. Therefore, the cover plate 8 is not visible in the graphic illustration of FIG. 1.

FIG. 2 illustrates a section through the bubble 10 of the cover plate 8, the plastic sheet 9, and a microswitch 5 connected to the cover plate. A bushing 27 is screwed in a bore 26 (FIG. 3) of the cover plate 8 by means of its external thread. The threaded neck 28 of the microswitch 5, which bears the adjusting or actuating element 29 in the center, is screwed into the interior thread of the bushing 27. The hollow space in the bushing 27 between the microswitch 5 and the bubble 10 is filled by a plastic cylinder 30. On its end face which faces the bubble, the plastic cylinder is provided with a curvature (or arch). On its opposite end face the plastic cylinder 30 is plane. The relevant dimensions of the bushing 27 and of the plastic cylinder 39 are matched to one another in such a fashion that the plastic cylinder 30, emplaced on the actuating element 29 of the microswitch 5, is centered beneath the bubble 10 with the exception of serveral tenths of a millimeter clearance (or play).

Upon depressing the bubble 10, the plastic cylinder 30, guided in the bushing 27, together with the actuating element 29 of the microswitch 5 which is guided in an interior bore of the threaded neck 28, is depressed. It is advantageous for the switching safety that the bubble 10 is curved (or arched) in a raised protruding fashion and therefore provides the operating individual with a feeling for the correct pressure location. Moreover, this bubble provides for the individual depressing of the latter with a physical resistance to be overcome. If this resistance is overcome, the bubble yields toward the interior, whereby its resistance suddenly shifts to a markedly lower value. The consequence of this is that the bubble and the plastic cylinder 30, entrained by the latter, and the adjusting element 29 of the microswitch 5, are always depressed through to the limit stop of the latter. Thus, the operating individual is always conscious, through tactile as well as acoustic sensations, as a consequence of the principle of the popping effect, of the exact switching time. This is a particular advantage also as compared with all so-called contactless switches in the case of which it cannot be ascertained, without a special signal-lighting, when the switching point has been reached. An additional advantage of the sample embodiment represented in FIGS. 2 and 3 is the easy assembly on any metal plate and the two relatively economical assembly elements required to this end, illustrated in FIG. 3, bushing 27 and the plastic cylinder 30. In addition, however, the major advance remains the absence of any type of gap or step contour which this solution provides as compared with every other type of solution. Since no gap is present whatsoever, neither can germs be spread from the interior of the apparatus to its surface, nor, conversely, can corrosive disinfectant fluid penetrate the interior of the apparatus. Finally, this principle is also applicable as an explosion protection in the case of explosion-protected embodiments.

FIGS. 4 and 5 illustrate a section of another bubble 18 of the control console 1. As the two figures illustrate, a different microswitch 6 is utilized which has no threaded neck. To this end, a tubular guide sleeve 31 is utilized which bears, at its upper end, a threaded neck 32 and, at its lower end, is shaped in the manner of a U-rail and adapted to the exterior dimensions of the microswitch 6. The legs 33, 34 (FIG. 5) of the guide sleeve are mounted on the housing of the microswitch 6. To this end, PVC-bolts 35, 36 are inserted through the bores present in the case of the conventional microswitches and through corresponding bores in the legs 33, 34 of the guide sleeves, which bolts are welded together with the legs at their protruding ends. Instead of the PVC-bolts, screws could also be used. This guide sleeve 31 is expediently fabricated as a plastic injection molding part. In a manner similar to the sleeve 27 of FIGS. 2 and 3, it can be screwed from below into a corresponding tapped hole 37 of the cover plate 8 and can be arrested at the correct distance by the lock nut 38. Prior to this, a plastic cylinder 39, matched in its length to the neck of the guide sleeve 31, is to be inserted in the sleeve 31.

Also in the case of this embodiment, the guide sleeve 31 is screwed in so far that the inserted plastic cylinder 39, resting on the actuating element 40 of the microswitch 6, has only a few tenths of a millimeter play in relation to the interior surface of the bubble 18 of the plastic sheet 9. In the case of corresponding series (multiple) production, the guide sleeve 31, shaped here in a somewhat complicated fashion, can be similarly economically manufactured as the sleeve 27 of FIGS. 2 and 3. In this embodiment, the same advantages occur which have been cited in the description relating to FIGS. 2 and 3.

FIG. 6, finally, illustrates a section through an additional bubble 20 of the control console 1, whereby the microswitch 7 is, in this instance, soldered onto a printed circuit board 41. In addition to the microswitch 7, a miniature filament lamp 42 is soldered onto the printing circuit board. The printed circuit board is support-mounted by means of spacing elements 43, 44 (only two illustrated) at a defined distance from the cover plate 8. The cover plate is bored through directly beneath the bubble 20. Between the actuating element 45 of the microswitch 7 and the bore 46 in the cover plate 8, a formed plexiglass piece 47 is inserted. The latter projects into the bore 46 of the cover plate 8 with an integral cylindrical pin 48 and is guided therein. The plexiglass formed piece is provided with a blind hole 49 which is placed over the miniature filament lamp 42. The blind hole 49 is provided at its end with an inclined (or slanted) end face (or plane surface) 50.

Upon depressing the bubble 20, the latter depresses the plexiglass formed piece 47 and the actuating element 45 of the microswitch 7. Upon releasing the bubble 20, the actuating element 45 of the microswitch 7 and the bubble 20 again spring back to their original positions. The plexiglass formed piece 47 is here entrained. By means of precise matched adjustment of the length of the spacing elements 43, 44, it is possible to make the play between the plexiglass formed piece 47, abutting the switching element 45 of the microswitch 7, and the inner surface of the bubble 20 amount to only a few tenths of a millimeter. In this instance, the bubble, without any type of dyeing, could be transparent, and a white, opaque symbol in a dark surrounding field, dyed opaque, on the curved upper surface of the pin 48 could be utilized indicated in FIG. 6A. This symbol is illuminated by the miniature filament lamp 42. This has the advantage that operation is also possible in a darkened room. Moreover, the advantages cited on the basis of the exemplary embodiment of FIGS. 2 and 3 also apply in the case of this exemplary embodiment.

In the further exemplary embodiment shown in FIG. 7, a printed circuit board 51, similar to that in the embodiment of FIG. 6, is mounted via spacing elements 52, 53, at a defined distance from the cover plate 8. A flanged tubular guide piece 55 for a plastic cylinder 56 consisting of plexiglass is inserted in the bore 54. There is mounted on the flange of the guide piece, a deflectible strip 57, provided with a light transmitting aperture 58, and consisting of spring bronze which engages the plastic cylinder 56 in the guide piece 55. The end of strip 57 opposite the mounting location thereof rests against or is aligned with the actuating element 45 of a microswitch 7 soldered onto the printed circuit board 51 so that depressing of the bubble-like portion 24 causes depression of element 45 against the action of its spring return, and with a further return force being exerted by strip 57. The latter microswitch 7 is the same microswitch which is also illustrated in FIG. 6. Directly beneath the aperture 58 in the deflectible strip 57, a luminescent diode 59, connected to the microswitch, is soldered into the printed circuit board.

The assembly construction illustrated in FIG. 7 is distinguished, in comparison with that of FIG. 6, by a lower sensitivity to warpages (or flexures) of the printed circuit board. Minor distance changes are compensated not only by the actuating path of the bubble 24 of the plastic sheet 9 but also by flexures (or deflections) of the plate 57. At the same time, the hole 58 in the deflectible strip 57 renders possible not only the passage of light, but also an enlargement of the actuating path of the strip 57 in the case of a given distance from the luminescent diode 59, because the latter can dip into the hole during depression of the plastic cylinder 56. The light utilization, due to the use of plexiglass for the plastic cylinder 56, is simultaneously improved.

In each embodiment, the end of the plastic cylinders such as 30, 39, 48 and 56 which is engageable with the interior surface of an associated bubble-like portion 10, 18, 20, 24 may have a convex generally semi-spherical curvature which conforms with the curvature of the bubble-like portion, as best seen in FIGS. 6 and 7.

The sheet 9 is of continuous stiff plastic construction, e.g. 0.125 millimeter thick polyester terephthalate and the bubble-like portions, such as 10-25, are so formed that they are depressible to produce a definite sound (called a "knackfrosch effekt" in German), the return forces of the system in each case being sufficient to restore the original arched bubble-like configuration upon release of manual pressure.

It will be apparent that many modifications and variations may be effected without departing from the scope of the novel concepts and teachings of the present invention.

I claim as my invention:

1. A control console with installed microswitches having respective actuating elements, particularly for the control of apparatus in the operating room, characterized in that a cover plate (8) has a continuous stiff plastic sheet (9) in covering relation thereto which sheet is arched so as to be raised to form depressible bubble-like portions in the region of said individual actuating elements of the installed microswitches, plastic cylinders being disposed in an intermediate space between the individual bubble-like portions of the plastic sheet (9) and the respectively allocated actuating elements of the microswitch for transmitting depression of each respective bubble-like portion to the associated actuating element, said plastic cylinders being matched to the diameter of the bubble-like portions and having convexly protrudingly curved end portions thereof facing the plastic sheet (9), a light source (42, 59) being allocated to each plastic cylinder (48, 56), and a separate plate (41, 51) connected with said cover plate (8) and mounted at a defined distance therefrom, the microswitches (7) being mounted on said separate plate (41, 51) the cover plate (8) having guide means (46, 55) in alignment with the respective bubble-like portions (20, 24) and said plastic cylinders (48, 56) being guided by said guide means (46, 55), said guide means comprising a sleeve (55) for each plastic cylinder (56) mounted by said cover plate (8), each sleeve (55) having at the end thereof remote from said cover plate (8) a spring plate (57) which is secured to said end of said sleeve (55) at its one end and acts, at its other end, against the associated actuating element (45) of the associated microswitch (7), each plastic cylinder (56) being reciprocally movable in its associated sleeve (55) and engaging with the associated spring plate (57), and said spring plate (57) having means (58) for transmitting light from said light source to the interior of said sleeve (55) for passage axially thereof via the associated plastic cylinder (56).

2. A control console according to claim 1, characterized in that the interior sides of the bubble-like portions facing the microswitches are printed with symbols.

3. A control console according to claim 1, characterized in that the bubble-like portions of the plastic sheet are transparent, and that the end portions of the plastic cylinders which are facing the respective individual bubble-like portions are each printed with one symbol.

4. A control console according to claim 1, characterized in that said plastic cylinders (48, 56) are made of plexiglass.

5. A control console according to claim 1, characterized in that the cover plate (8) is covered with a 0.125 mm-thick polyester terephthalate sheet (9).

6. A control console according to claim 1, characterized in that the side of the plastic sheet (9) which is facing the cover plate (8) is printed with symbols.

7. A control console comprising installed microswitches having respective actuating elements, a cover plate (8) having a continuous stiff plastic sheet (9) in covering relation thereto which sheet is arched so as to be raised to form depressible bubble-like portions in the region of said individual actuating elements of the installed microswitches, translucent plastic cylinders being disposed in an intermediate space between the individual bubble-like portions of the plastic sheet (9)

and the respectively allocated actuating elements of the microswitch for transmitting depression of each respective bubble-like portion to the associated actuating element, said plastic cylinders being matched to the diameter of the bubble-like portions and having convexly protrudingly curved end portions thereof facing the plastic sheet (9), a light source (59) being allocated to each plastic cylinder (56), and a separate plate (51) connected with said cover plate (8) and mounted at a defined distance therefrom, the microswitches (7) being mounted on said separate plate (51), the cover plate (8) having guide means (55) in alignment with the respective bubble-like portions (24) and said plastic cylinders (56) being guided by said guide means (55), a spring plate (57) operatively interposed between each plastic cylinder (56) and the associated actuating element (45) of the associated microswitch (7), said spring plate (57) having first and second ends, mounting means mounting the first end of said spring plate in fixed relation to said cover plate (8) and said separate plate (51) so that the spring plate extends in supporting relation to the associated plastic cylinder (56) with the second end disposed to act against the associated actuating element (45) of the associated microswitch (7), each plastic cylinder (56) being reciprocally movable in its associated guide means (55) and engaging with the associated spring plate (57), and said spring plate (57) having means (58) for transmitting light to the associated plastic cylinder (56).

8. A control console according to claim 7, characterized in that the interior sides of the bubble-like portions facing the microswitches are printed with symbols.

9. A control console according to claim 8, characterized in that the bubble-like portions of the plastic sheet are transparent, and that the end portions of the plastic cylinders which are facing the respective individual bubble-like portions are each printed with one symbol.

10. A control console according to claim 8, characterized in that said plastic cylinders (56) are made of plexiglass.

11. A control console according to claim 8, characterized in that the cover plate (8) is covered with a 0.125 mm-thick polyester terephthalate sheet (9).

12. A control console according to claim 8, characterized in that the side of the plastic sheet (9) which is facing the cover plate (8) is printed with symbols.

13. A control console according to claim 8, with said control console having symbols relating to operating room apparatus and being readily sterilizable.

* * * * *